United States Patent [19]

Sekiguchi

[11] Patent Number: 5,125,808
[45] Date of Patent: Jun. 30, 1992

[54] HYDRAULIC PUMP APPARATUS

[75] Inventor: Akihiko Sekiguchi, Saitama, Japan

[73] Assignee: Akebono Brake Industry Co., Ltd., Tokyo, Japan

[21] Appl. No.: 507,831

[22] Filed: Apr. 12, 1990

[30] Foreign Application Priority Data

Apr. 12, 1989 [JP] Japan .................. 1-42076[U]

[51] Int. Cl.$^5$ ............... F04B 21/08; F01B 11/02
[52] U.S. Cl. ...................... 417/569; 417/572; 92/165 PR; 92/171.1
[58] Field of Search ............. 92/165 PR, 171.1, 72, 92/169.1; 417/569, 572; 403/378, 379; 411/508, 513, 514, 521, 913

[56] References Cited

U.S. PATENT DOCUMENTS

| | | | |
|---|---|---|---|
| 4,406,215 | 9/1983 | Lacasse | 92/165 PR |
| 4,442,759 | 4/1984 | Elser | 92/165 PR |
| 4,509,799 | 4/1985 | Roling | 92/165 PR |
| 4,806,064 | 2/1989 | Breese | 411/513 |

Primary Examiner—Leonard E. Smith
Assistant Examiner—M. Kocharov
Attorney, Agent, or Firm—Cushman, Darby & Cushman

[57] ABSTRACT

A hydraulic pump apparatus which is provided with a sleeve member sealingly accommodated in a housing, a cam member driven by a motor and slidably mounted in the sleeve member, a plunger abutting against the cam member, a plunger chamber housed in the sleeve member, a capacity of which varies in accordance with a slide movement of the plunger, a suction passage and an ejection passage formed in the housing, a fluid introducing passage communicating with the suction passage of the housing, a suction valve disposed between the fluid introducing passage and the plunger chamber, an ejection valve disposed between the plunger chamber and the ejection passage of the housing, a hollow engaging member for preventing the plunger from rotating with respect to the housing, the engaging member is disposed at a position bridging the suction passage of the housing and the fluid introducing passage of the sleeve member.

6 Claims, 3 Drawing Sheets

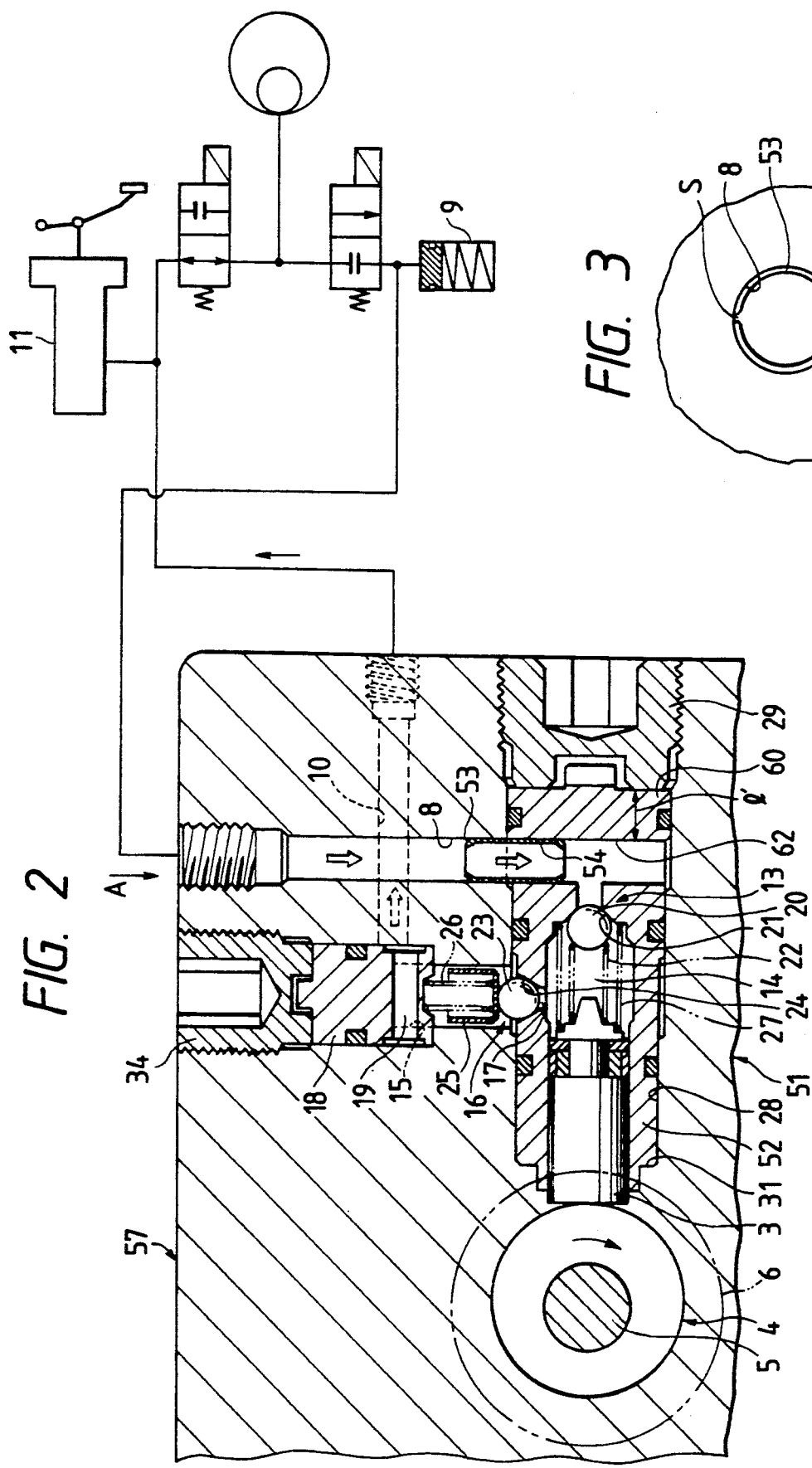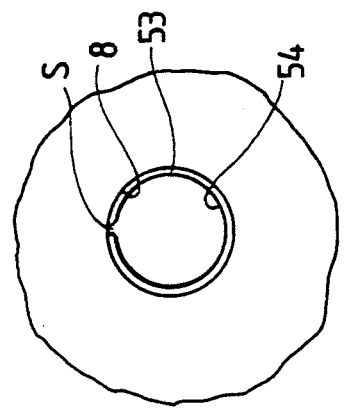

HYDRAULIC PUMP APPARATUS

BACKGROUND OF THE INVENTION

1. Field of the Invention

The present invention relates generally to a hydraulic pump apparatus, and more particularly to an engaging member for preventing a sleeve mounted in a housing of the hydraulic pump apparatus from rotating with respect to the housing.

2. Related Art

There is known a conventional hydraulic pump apparatus of a plunger type for supplying a brake fluid of the brake apparatus for a vehicle, for example. FIG. 1 is a sectional view showing the conventional hydraulic pump apparatus 1.

The conventional hydraulic pump apparatus 1 is provided with a sleeve 2, a plunger 3 slidably mounted in the sleeve 2, an eccentric cam 4 having a cam shaft 5, a motor 6 engaging with the cam shaft 5. The sleeve 2 is fluid-sealingly accommodated in a housing 7, and the motor 6 is mounted in the housing 7.

A suction passage 8 is formed in the housing 7 and communicated with a reservoir 9, for example. The fluid ejected from the hydraulic pump 1 is supplied to a master cylinder 11 through an ejection passage 10 formed in the housing. In the sleeve 2, a fluid introducing passage 12 is provided for communicating the suction passage 8 with a plunger chamber 14 formed in the sleeve 2 through the suction valve 13, and a communicating passage 15 is provided, which communicates with the plunger chamber 14 through an ejection valve 16 and an ejection port 17. The communicating passage 15 also communicates with the ejection passage 10 through a passage 19 of a set plug 18.

The suction valve 13 is composed of a ball 20 and a valve spring 22 for urging the ball 20 against a valve seat 21 of the sleeve 2. On the other hand, the ejection valve 16 is composed of a ball 23 and a valve spring 26 accommodated in a spring holder 25 for urging the ball 23 against a valve seat 24 of the sleeve 2.

When the plunger 3 which always contacts to the eccentric cam 4 by an elastic force of the spring 27 slides in a direction by which a capacity of the plunger chamber 14 increases, the ball 20 removes from the valve seat 21 to thereby introducing the fluid from the reservoir 9 into the plunger chamber 14 through the suction passage 8 and fluid introducing passage 12. On the other hand, the plunger slides in a direction by which the capacity of the plunger chamber 14 decreases, the fluid contained in the plunger chamber 14 is pressurized so that the ball 23 removes from the valve seat 24 to thereby eject the fluid in the chamber 14 to the master cylinder 11 through the communicating passage 15, fluid passage 19 and ejection passage 10.

The sleeve 2 is tightly fitted in a cylindrical hole 28 formed in the housing 7, and a boss part 30 of the sleeve 2 is pushed by a plug screw 29 so that the sleeve 2 is urged toward a hole end part 31. The boss part 30 of the sleeve 2 is provided with a pin hole 32 and the housing 7 is provided with a pin hole 33. A solid rotation-preventing pin 34 is fitted in the pin hole 32 of the boss part 30 and the pin hole 32 of the housing 7, so that the sleeve 2 is prevented from rotating in the housing.

As described above, the conventional hydraulic pump apparatus employs the solid rotation-preventing pin 34 for preventing the sleeve 2 from rotating, it is necessary to provide the pin hole 32 in the boss part 30 of the sleeve 2 and the pin hole 33 in the housing 7. For such a structure, the boss part 30 must be large enough to accommodate the pin hole 32. That is, the length of the boss part 30 must be elongated by an amount of a diameter of the pin hole 32 and, accordingly, the length of the housing 7 is elongated. As a result, the hydraulic pump apparatus 1 will disadvantageously be large in size and heavy in weight. The hydraulic pump apparatus for use in a vehicle such as an automobile is required small in size and light in weight.

SUMMARY OF THE INVENTION

In view of the foregoing problem accompanying the conventional apparatus, an object of the present invention is to provide a hydraulic pump apparatus which can be manufactured small in size and light in weight.

Another object of the invention is to provide a sleeve engaging member employed in a hydraulic pump apparatus, which member is simple in structure.

The above and other objects of the present invention can be achieved by a provision of a hydraulic pump apparatus which, according to the invention, is provided with: a sleeve member sealingly accommodated in a housing; a cam member driven by a motor and slidably mounted in the sleeve member; a plunger abutting against the cam member; a plunger chamber housed in the sleeve member, a capacity of which varies in accordance with a slide movement of the plunger; a suction passage and an ejection passage formed in the housing; a fluid introducing passage communicating with the suction passage of the housing; a suction valve disposed between the fluid introducing passage and the plunger chamber; an ejection valve disposed between the plunger chamber and the ejection passage of the housing; a hollow engaging member for preventing the plunger from rotating with respect to the housing, the engaging member is disposed at a position bridging the suction passage of the housing and the fluid introducing passage of the sleeve member.

The sleeve is prevented from rotating with respect to the housing by the hollow engaging member disposed at the position bridging the fluid introducing passage 62 and the suction passage of the housing. The suction passage and the fluid introducing passage are communicated with each other through the engaging member. Since the engaging member having such a structure is employed for preventing the sleeve from rotating with respect to the housing, no extra part for mounting therein a solid rotation-preventing pin is required. Therefore, the length of the sleeve can be shortened and the hydraulic pump apparatus can be manufactured small in size and light in weight.

BRIEF DESCRIPTION OF THE DRAWINGS

FIG. 2 is a sectional view showing an essential part of a hydraulic pump apparatus having a sleeve engaging member according to one embodiment of the invention; and FIG. 3 shows the hydraulic pump apparatus viewing from an arrow A of FIG. 2.

DESCRIPTION OF THE PREFERRED EMBODIMENT

The preferred embodiment of the present invention will now be described with reference to accompanying drawings.

FIG. 2 is a sectional view showing an essential part of a hydraulic pump apparatus according to the present invention and FIG. 3 shows the hydraulic pump apparatus viewing from an arrow A of FIG. 2.

Figure 1:
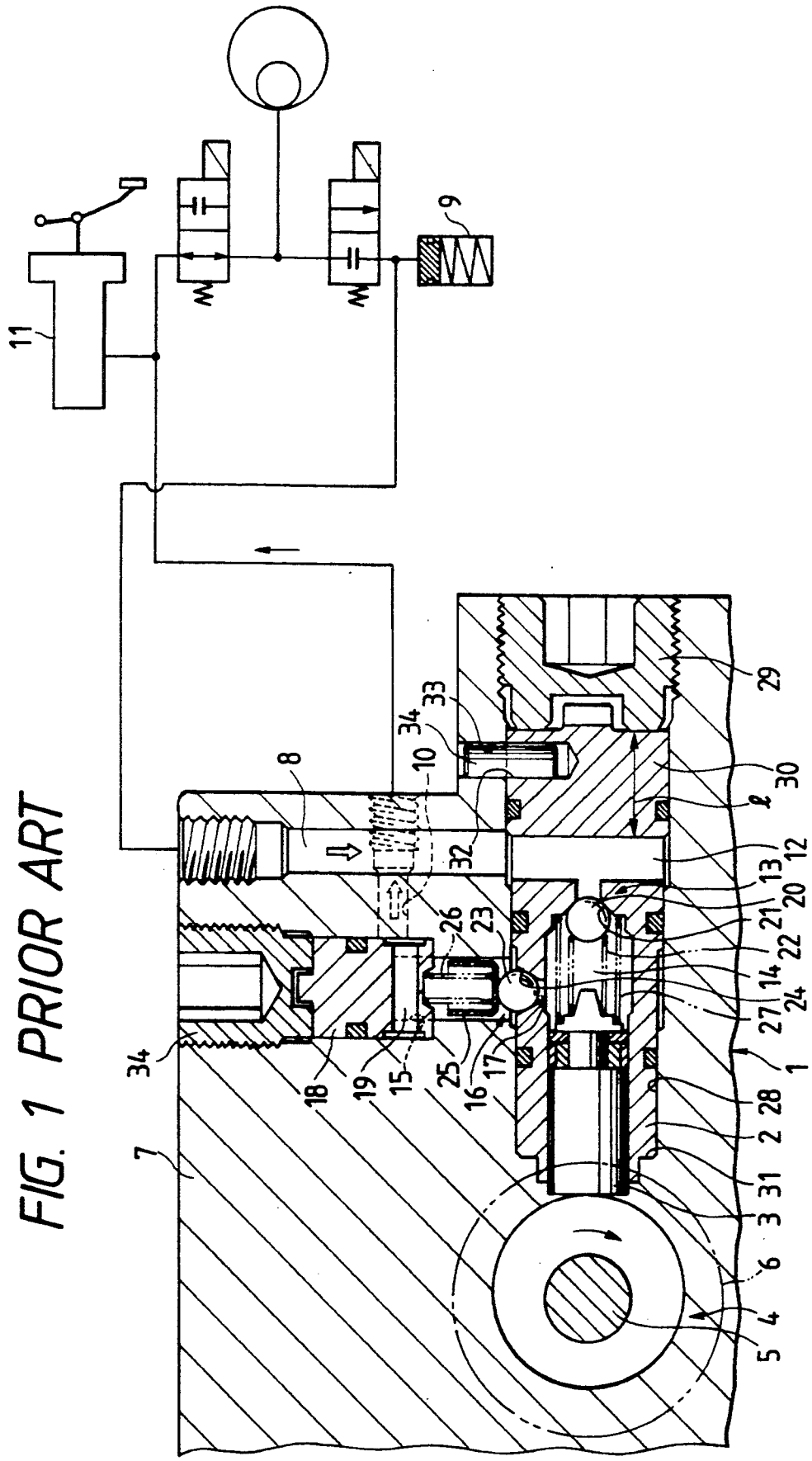
FIG. 1 is a sectional view showing an essential part of a conventional hydraulic pump apparatus having a sleeve engaging member.

In FIGS. 2 and 3, like parts and components are designated by the same reference numerals as that of FIG. 1.

A hydraulic pump apparatus 51 is provided with a housing 57 having a suction passage 8, and a sleeve 52 having a fluid introducing passage 62. The fluid introducing passage 62 is provided on a common axis to and the same inner diameter as that of the suction passage 8. A spring pin 53 is disposed at a position bridging the suction passage 8 and the fluid introducing passage 62 so that the sleeve 52 does not rotate with respect to the housing 57. The spring pin 53 performs as an engaging member for preventing the sleeve 52 from rotating with respect to the housing 57. The spring pin 53 is provided with a through hole 54 through which the suction passage 8 communicates with the fluid introducing passage 62. The spring pin 53 is also provided with a slit S along a longitudinal axis thereof so that the pin is compressible with respect to a radial direction thereof.

As described above, since the cylindrical spring pin 53 disposed between the fluid introducing passage 62 of the sleeve 52 and the suction passage 8 of the housing 57 is employed as a rotation-preventing pin for preventing the sleeve 52 from rotating, the sleeve 52 does not require an extra part for mounting a stopper pin which is required by the conventional apparatus employing the solid rotation-preventing pin. Therefore, according to the present invention, a length l' of the boss 60 of the sleeve 52 is shortened so that the hydraulic pump apparatus 51 can be made in small in size and light in weight.

Further, in the embodiment described above, the suction passage 8 and the fluid introducing passage 62 are cylindrically provided on a common axis having the same inner diameter as each other. Accordingly, the spring pin on the market of the JIS (Japanese Industrial Standard) type can be employed as it is, thereby reducing the manufacturing cost.

Figure 4:
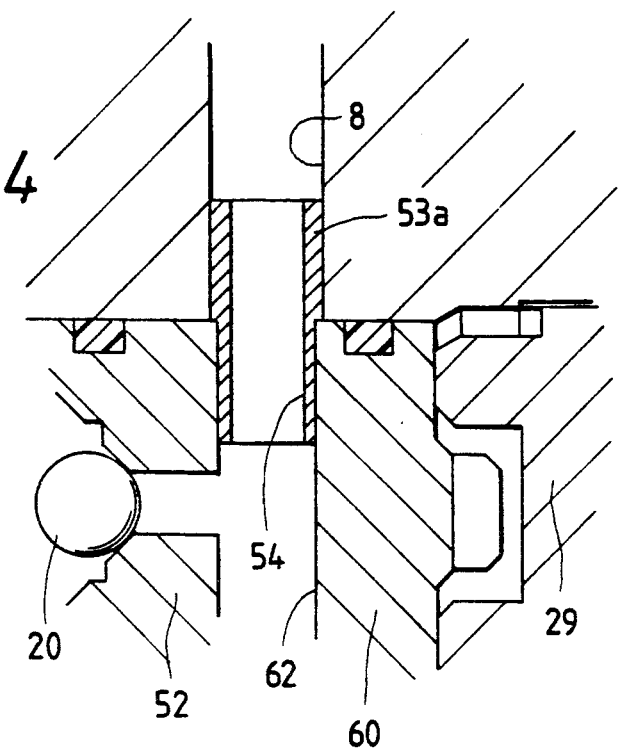
FIG. 4 is a sectional view illustrating the difference in diameters between the suction passage and the fluid introducing passage, and a cylindrical spring pin which mounts the two passages.
Figure 5:
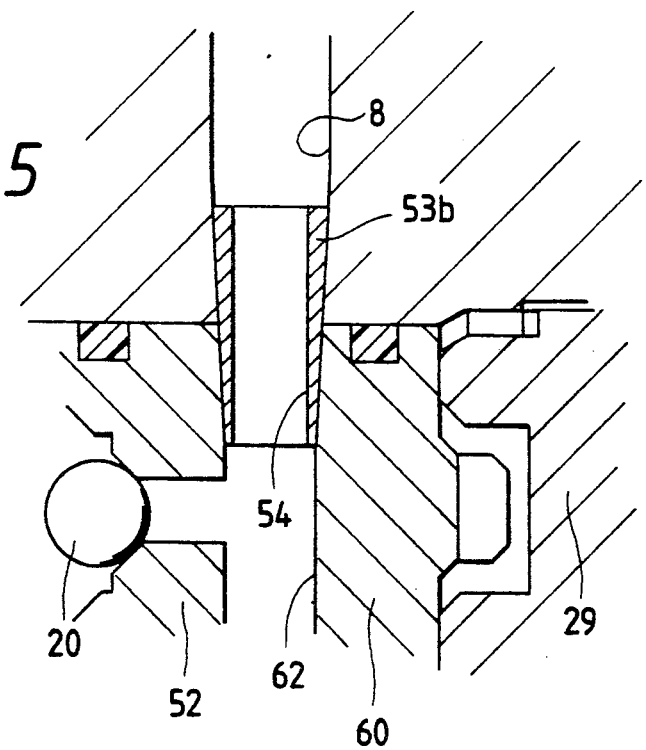
FIG. 5 is a sectional view as in FIG. 4, except that the fluid introducing passage is tapered.

Various arrangements and modifications may be applicable without exceeding the scope of the invention. For example, as shown in FIG. 4, the inner diameter of the suction passage may be different from that of the fluid introducing passage. In FIG. 4, cylindrical spring pin 53a is shown which is elastically mounted to these passages. In another arrangement within the scope of the present invention, the suction passage and the fluid introducing passage may be tapered. Such a modification is illustrated in FIG. 5.

The operation of the pump apparatus of the invention is the same as that of the conventional apparatus shown in FIG. 1. That is, when the plunger slides in a direction by which a capacity of the chamber 14 increases, the suction valve 13 opens to thereby introducing the fluid contained in the reservoir 9 into the chamber 14 through the suction passage 8, through hole 54 of the spring pin 53, and the fluid introducing passage 62.

On the other hand, when the plunger slide in a direction by which the capacity of the chamber 14 decreases, the fluid contained in the chamber 14 is pressurized to thereby open the ejection valve 16 so that the fluid is ejected to the master cylinder 11 through the communicating opening 15, fluid passage 19 and the ejection passage 10.

Therefore, during the anti-lock control operation of the vehicle, for example, the brake fluid a pressure of which is decreased is supplied to the reservoir 9, and then the brake fluid is pumped up to the master cylinder 11 by the reciprocating movement of the plunger 3.

The housing 57 of the invention may be a pump body itself housing therein only the hydraulic pump 51. Further, the housing 57 may be one of a various type of actuators having solenoids or the like. In this case, a motor 6 is disposed for driving the plunger 3. The apparatus shown in FIG. 2 is also provided with a plug screw 34 for fixing a set plug 18.

As described above, according to the sleeve engaging means of the hydraulic pump of the present invention, since the cylindrical spring pin 53 is elastically mounted in the fluid introducing passage 62 of the sleeve and the suction passage 8 of the housing 57, the sleeve 52 is engaged with the housing 57, and the suction passage 8 communicates with the fluid introducing passage 62 through the through hole 54 of the spring pin 53. Therefore, the sleeve does not require an extra part for mounting a stopper pin which is required by the conventional apparatus employing the solid rotation-preventing pin. According to the present invention, the length of the sleeve is shortened so that the hydraulic pump apparatus can be made in small in size and light in weight.

What is claimed is:

1. A hydraulic pump apparatus for use in a brake device, comprising:
   a housing;
   a sleeve sealingly accommodated in said housing;
   a cam means slidably fitted in said sleeve;
   a plunger abutting against said cam means;
   a plunger chamber formed in said sleeve, a capacity of said plunger chamber varying in accordance with a reciprocal movement of said plunger;
   a suction passage formed in said housing;
   an ejection passage formed in said housing;
   a fluid introducing passage formed in said sleeve for communicating with said suction passage of said housing;
   a suction valve provided between said fluid introducing passage and said plunger chamber;
   an ejection valve provided between said plunger chamber and said ejection passage of said housing; and
   means for preventing said plunger from rotating with respect to said housing, said preventing means having a through hole, said preventing means being provided at a position bridging said suction passage of said housing and said fluid introducing passage of said sleeve.

2. The hydraulic pump apparatus of claim 1, wherein said rotation preventing means is a spring pin having a slit extending along a longitudinal axis thereof and being compressible with respect to a radial direction thereof.

3. The hydraulic pump apparatus of claim 1, wherein said suction passage communicates with a reservoir, and said ejection passage communicates with a master cylinder of the brake device.

4. The hydraulic pump apparatus of claim 1, wherein an inner diameter of said suction passage of said housing is the same as that of said fluid introducing passage.

5. The hydraulic pump apparatus of claim 1, wherein an inner diameter of said suction passage of said housing is different from that of said fluid introducing passage, and said rotation preventing means is provided with a step part.

6. The hydraulic pump apparatus of claim 1, wherein said fluid introducing passage of said sleeve is tapered, and said rotation preventing means is tapered correspondingly.

* * * * *